United States Patent [19]

Schlumpf et al.

[11] Patent Number: 5,292,547

[45] Date of Patent: Mar. 8, 1994

[54] METHOD FOR ENVIRONMENTALLY BENIGN PAINT SPRAYING USING A DISPERSION OF OVEN CURED LACQUER ENAMEL IN WATER

[75] Inventors: Georg Schlumpf, Herisau; Hanspeter Wepf, Frauenfeld, both of Switzerland

[73] Assignee: Unicolor AG, Lachen, Switzerland

[21] Appl. No.: 743,413

[22] Filed: Sep. 24, 1991

[30] Foreign Application Priority Data

Dec. 22, 1989 [CH] Switzerland ................. 4615/89-4

[51] Int. Cl.$^5$ ................... B05D 1/02; B01D 61/14
[52] U.S. Cl. .................................. 427/8; 427/345; 427/421; 118/326; 210/639; 210/650
[58] Field of Search ............... 427/345, 421, 8; 118/326, DIG. 7; 210/650, 639, 712, 930

[56] References Cited

U.S. PATENT DOCUMENTS

| | | | |
|---|---|---|---|
| 4,455,332 | 6/1984 | Günther | 427/421 |
| 4,564,464 | 1/1986 | Harpel et al. | 427/345 |
| 4,607,592 | 8/1986 | Richter | 427/345 |

FOREIGN PATENT DOCUMENTS

| | | |
|---|---|---|
| 715025 | 9/1968 | Belgium . |
| 0032554 | 7/1981 | European Pat. Off. . |
| 0117586 | 9/1984 | European Pat. Off. . |
| 0141171 | 5/1985 | European Pat. Off. . |
| 0271015 | 6/1988 | European Pat. Off. . |
| 306628 | 3/1989 | European Pat. Off. . |
| 312987 | 4/1989 | European Pat. Off. . |
| 335210 | 10/1989 | European Pat. Off. . |
| 1669191 | 7/1971 | Fed. Rep. of Germany . |
| 2353469 | 4/1975 | Fed. Rep. of Germany . |
| 2945523 | 5/1981 | Fed. Rep. of Germany . |
| 3428300 | 2/1986 | Fed. Rep. of Germany . |
| 1557411 | 2/1969 | France . |
| 2375281 | 7/1978 | France . |
| 49-51324 | 5/1974 | Japan . |
| 60-147273 | 8/1985 | Japan . |

OTHER PUBLICATIONS

Rompps Chemie-Lexikon, p. 231, 1979 (no month available).
Ullmanns Encyclopadie der Technischen Chemie, 4th ed., vol. 15, pp. 658–660, 1978 (no month available).
Research Disclosure, Nr 128, Dec. 1974, Havant, GB, p. 4 AKZO Chemie BV: "Stabilisation of Printing Inks and Coatings Containing Chlorinated Acetophenones as Photo-Initiators" Nr 12806.

*Primary Examiner*—Shrive Beck
*Assistant Examiner*—Katherine A. Bareford
*Attorney, Agent, or Firm*—Egli International

[57] ABSTRACT

A method is provided for environmentally benign paint spraying with a dispersion of oven-curable lacquer in water in a paint spraying station having a cubicle with water-rinsed rear wall for collecting and washing out of overspray in cubicle waste water. The entire cubicle waste water is separated by ultrafiltration into permeate and lacquer-containing residue, the permeate being returned to the paint spraying station, the lacquer-containing residue being enriched with lacquer by removing water until its lacquer content is essentially equal to that of dispersion that is freshly fed to the spray painting station. The residue that is enriched with lacquer is admixed to the freshly fed dispersion for reuse in spray painting. A constituent for preventing coalescence of the lacquer is admixed to the dispersion fed to the paint spraying station, wherein a constituent for the inhibition of the drying is admixed to the dispersion that is fed to the paint spraying station, a constituent for adjusting the throughput for ultrafiltration is admixed to the cubicle waste water, and the conductibility of the water returned to the paint spraying station is monitored and kept below the limit.

9 Claims, 1 Drawing Sheet

METHOD FOR ENVIRONMENTALLY BENIGN PAINT SPRAYING USING A DISPERSION OF OVEN CURED LACQUER ENAMEL IN WATER

CROSS REFERENCE TO RELATED APPLICATIONS

This application is the U.S. national stage of PCT International Application No. PCT/CH 90/00192, filed on Aug. 15, 1990 and amended under PCT Article 19 on Apr. 15, 1991.

BACKGROUND OF THE INVENTION

The invention relates to a method for environmentally benign paint spraying with a dispersion of oven-drying lacquer in water in a paint spraying station that is provided with a cubicle with water-rinsed rear wall for collecting and washing out of overspray in cubicle waste water, the entire cubicle waste water being separated by ultrafiltration into permeate and lacquer-containing residue, the entire permeate being returned to the paint spraying station, the lacquer-containing residue being enriched with lacquer by removing water until the lacquer content is essentially equal to that of dispersion that is fed to the paint spraying station the residue that is enriched with lacquer in this way being admixed to the freshly fed dispersion for reuse in spray painting, and with a constituent for preventing coalescence of the lacquer being admixed to the dispersion fed to the paint spraying station.

In prior art the overspray will be disposed of, which constitutes a heavy burden for the environment and is also very costly. For instance, a binding agent for oven-drying lacquer, which can be dispersed in water, is known from EP-0032554: the disposal of such a binding agent constitutes a heavy burden to the environment, because it Contains phosphor. Besides, special measures have to be taken so as to avoid conglutination of the appliances used for separating the overspray from the cubicle waste water, in this context cf. for example DE-3704683.

The separation of cubicle waste water into permeate and lacquer-containing residue by means of ultrafiltration is known, for example, from EP-0307047, EP-0245863, EP-0137877 or EP-0127685. On the other hand, it is known from EP-0318827 or EP-0271015 that the permeate has to be deacidified before it is returned to the paint spraying residue. Both of these aspects of the state of the art are taken into account in EP-0217212.

Experiments for the recuperation of the lacquer from the overspray in cubicle waste water are made reference to in "Oberfläche +JOT" 5/1987, page 36, however, in this publication they are considered as "successful only in certain cases". In "Oberfläche +JOT" 2/1988, pages 24–25, lacquer and binding agent circuits in the spraying cubicle are qualified as "future", while the recuperation of the lacquer by means of special reprocessing is mentioned as known. Also in DE-3800980, the recuperation of the lacquer by means of reprocessing is known.

In "Oberfläche +JOT" 5/1988, pages 61–63, the use of amines for preventing coalescence of over-drying lacquer and the additional cleaning of the cubicle waste water by reverse osmosis following its separation into permeate and lacquer residue are mentioned. In this publication, the recuperation of the lacquer from the overspray is considered as being "in its initial stages of development".

Therefore it is in accordance with prior art that the lacquer-containing residue has to be disposed of.

SUMMARY OF THE INVENTION

From EOP-0141171 a method for paint spraying with a dispersion of lacquer in water is known. The paint spraying station is equipped with a cubicle with water-rinsed rear wall for collecting and washing out of overspray in cubicle waste water. If the concentration of the overspray in the cubicle waste water reaches about 20% a partial current of the cubicle waste water circuit is conveyed through a filtration unit so as to be separated into filtrate and lacquer-containing residue. The filtrate consists of cleaned water and is returned to the paint spraying station for water rinsing of the cubicle rear wall. At the lacquer-containing residue several parameters are measured such as for example conductibility, in order to regulate filtration in a way that the measured parameters will be approximately equal to those in the freshly fed dispersion. The residue, which is enriched with lacquer in this way, will then be admixed to freshly fed dispersion and thus reused for paint spraying. The overspray in the cubicle waste water is not stable, and it is specified in EP-0141171 that the mixture must pass through dispergers so as to temporarily stabilize it. Besides, in this method according to EP-0141171 only a partial current of the cubicle waste water is treated and as a consequence the unit needs an appropriate pipe and control system.

It is known from JP-49-51324 to enrich the lacquer-containing residue with lacquer by removing water from the total cubicle waste water and to reuse the residue enriched with lacquer in this way for paint spraying. It is recommended to use deionized water in order to avoid contamination of the dispersion, but it is expressly pointed out that also regular tap water may be used.

In contrast, it is the object of the invention to specify a method of the kind mentioned at the outset, by means of which no quantities of cubicle waste water, permeate and lacquer-containing residue must be disposed of which would constitute a significant burden for the environment.

This object is achieved, according to the invention, in that a constituent for the inhibition of the drying is admixed to the dispersion that is fed to the paint spraying station, that a constituent for adjusting the throughput for ultrafiltration is admixed to the cubicle waste water, and that the conductibility of the water returned to the paint spraying station is monitored and kept below a limit.

Preferably, the constituent for adjusting the throughput in the ultrafiltration is a glycol derivative.

Preferably, the lacquer is an alkyd resin or a combination of alkyd and acrylic resin.

Preferably, only water with a conductibility of less than $10^{-4} \Omega^{-1} cm^{-1}$ is freshly fed to the paint spraying station, which is preferably achieved by reverse osmosis.

Preferably, the constituent for preventing coalescence of the lacquer is selected from one of several aliphatic amines of an average molecular weight of 75 to 133, its mixtures or derivatives.

Preferably, the dispersion and/or cubicle waste water additionally contains a biocidal constituent.

Preferably, the enrichment of the lacquer-containing residue up to the lacquer content of the freshly fed dispersion is essentially continuous and the residue enriched with lacquer is reused for spray painting in an essentially continuous way.

Preferably, the enrichment of the lacquer-containing residue up to the lacquer content of the freshly fed dispersion is essentially discontinuous, i.e. in batches (batch method), the residue enriched with lacquer being kept in an intermediate reservoir prior to is being reused for spray painting.

The main advantage of the method of the invention is that the exposure of the environment is lessened by the considerable reduction of the substances to be disposed of, brought about by the reuse of permeate and lacquer-containing residue, in accordance with the invention, in a closed circuit passing the paint spraying station. It is another advantage that the mentioned reuse of permeate and lacquer-containing residue constitutes an optimum solution from an economical point of view.

BRIEF DESCRIPTION OF THE DRAWINGS

The invention will be set forth hereinafter with reference being made to the drawing in which.

DETAILED DESCRIPTION OF PREFERRED EMBODIMENTS

Figure 1:
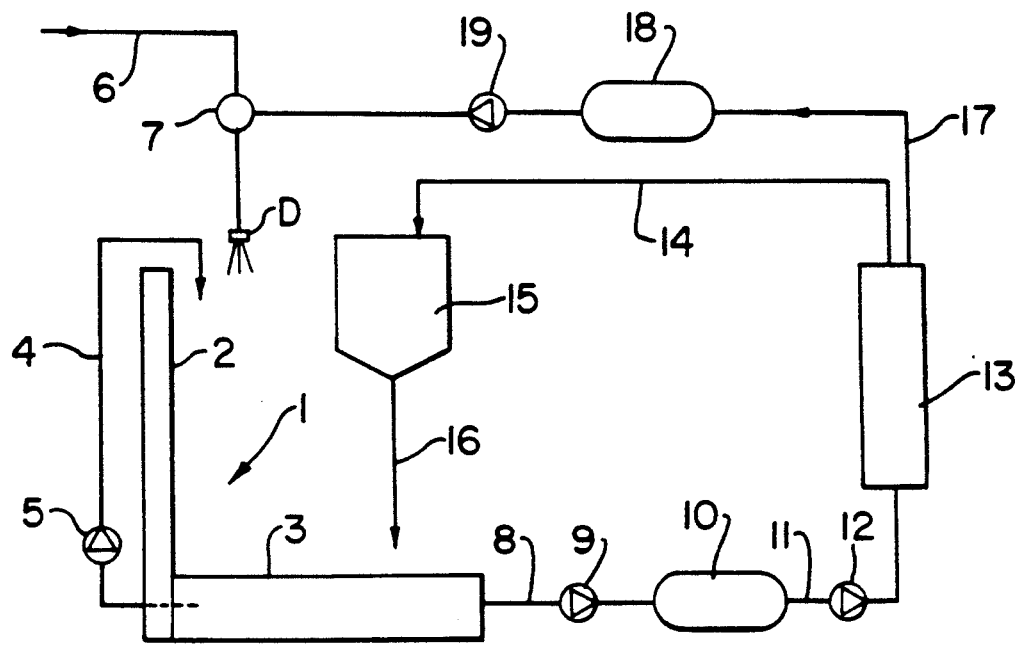
FIG. 1 is a diagram of a closed circuit passing the paint spraying station and designed for the continuous implementation of the method of the invention.
Figure 2:
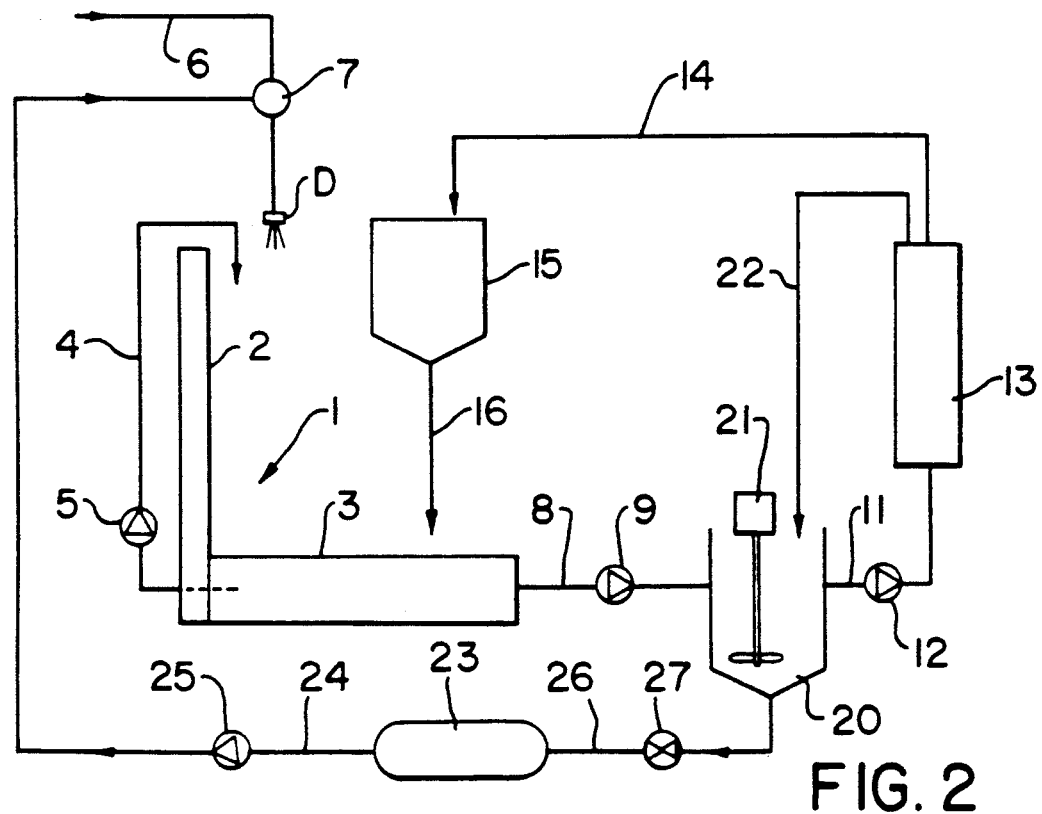
FIG. 2 is a diagram of a closed circuit passing the paint spraying station and designed for the discontinuous implementation of the method of the invention in batches (batch method).

FIGS. 1 and 2 show a per se well-known paint spraying station with a cubicle 1, a water-rinsed rear wall 2 and a tank 3 as well as a rinsing conduit 4 with associated pump 5. The rinsing system of the rear wall is designed to collect and wash out the overspray in water in a known way, which is collected as cubicle waste water in the tank 3.

Fresh dispersion of oven-drying lacquer in water is fed to the paint spraying station by way of a conduit 6 and a union 7 and sprayed through the nozzle D.

In FIG. 1 the cubicle waste water is conveyed to an intermediate reservoir 10 by way of the discharge 8 with associated pump 9, and from there it is conveyed to an ultrafiltration unit 13 by way of a conduit 11 with associated pump 12. In the ultrafiltration unit 13 the cubicle waste water is separated into permeate and lacquer-containing residue. The permeate is returned to the paint spraying station by way of the conduit 14, the intermediate reservoir 15 and the conduit 16.

In FIG. 2 the cubicle waste water is conveyed to an intermediate reservoir 20, which is equipped with a stirrer 21, by way of the discharge 8 with associated pump 9, and from there it is conveyed to an ultrafiltration unit 13 by way of a conduit 11 with associated pump 12. In the ultrafiltration unit 13 the cubicle waste water is separated into permeate and lacquer-containing residue. The permeate is returned to the paint spraying station by way of the conduit 14, the intermediate reservoir 15 and the conduit 16.

In FIG. 1 the lacquer containing residue from ultrafiltration is conveyed from the ultrafiltration unit 13 via the conduit 17 and to an intermediate reservoir 18 and from there to the union 7 by means of the pump 19.

In FIG. 2 the lacquer containing residue from ultrafiltration is conveyed from the ultrafiltration unit 13 back to the intermediate reservoir 20 by way of the conduit 22. From the intermediate reservoir 20 a discharge conduit 26 leads to an intermediate reservoir 23 by way of a stop valve 27 and from there to the union 7 via a conduit 24 with associated pump 25.

Hence, in both cases of FIGS. 1 and 2 the residue from ultrafiltration enriched with lacquer in the ultrafiltration unit 13 is reused for paint spraying in the nozzle D. In order to make this reuse possible, also the measures described hereinafter will be taken.

A constituent for preventing coalescence of lacquer is admixed to the dispersion which is fed to the paint spraying station at the nozzle, so as to avoid that the lacquer that is circulating in the system will settle and clog up the system. This constituent is admixed to the cubicle waste water and/or to the dispersion fed to the paint spraying station. Because of the large evaporation area and the long sojourn time of the lacquer in the cubicle waste water in connection with the described recirculation, preferably a constituent with low vapor pressure at room temperature is selected. Such a constituent is selected from the group of amines in a known manner, however, according to the invention, this constituent is selected from one or several aliphatic amines of an average molecular weight of 75 to 133, their mixtures or derivatives. As examples for such substances isopropanolamine, dimethylethanolamine, diisopropanolamine and their mixtures may be quoted.

Furthermore, in accordance with the invention, a constituent for inhibiting drying of the lacquer before oven-drying is admixed to the dispersion, which is fed to the paint spraying station, so as to prevent that the lacquer circulating in the pump will cure (polymerize) and conglutinate the system in an insoluble manner. Even though such inhibitors are per se well-known, they have been used only in connection with air-drying lacquers since there had been no reason whatsoever for using them in connection with oven-drying lacquer. According to this invention, such a constituent will now be used in connection with an oven-drying lacquer. As examples for such substances ketoximes, butoximes, etc. and their mixtures may be quoted.

Besides, a constituent for adjusting the throughput in ultrafiltration is admixed to the cubicle waste water, which is preferably a glycol derivative. As examples for such substances butylglycol, butyldiglycol, propyleneglycols and the like may be quoted.

Also the conductibility of the water that is freshly fed to the paint spraying station is monitored and kept below a limit in order to avoid that ions and especially calcium ions coagulate the lacquer that is circulating in the system and that the system will be clogged up in this way. Preferably, only such water will be freshly fed to the paint spraying station, which has a conductibility of less than $10^{-4} \Omega^{-1} cm^{-1}$. This conductibility is preferably achieved by reverse osmosis. The fresh water will be needed when the system is filled up for the first time and also for compensating evaporation loss.

Finally, for accomplishing direct reuse, the lacquer-containing residue from the ultrafiltration is enriched with lacquer by removal of water from the cubicle waste water, until its lacquer content is essentially similar to that of the freshly fed dispersion so that the recuperated dispersion is equally sprayable as the freshly fed dispersion. This may be done in two ways.

In the embodiment according to FIG. 1 the enrichment of the lacquer-containing residue from ultrafiltration is continuous. The residue from ultrafiltration that has been enriched with lacquer until becoming sprayable is essentially reused continuously for paint spraying, even though it may occasionally be held up in the intermediate reservoir 18. For this purpose, the capacity of the ultrafiltration unit 13 is dimensioned in a way that it removes water from the cubicle waste water at a speed essentially equal to the speed at which permeate is fed to the paint spraying station.

In the embodiment according to FIG. 2 the enrichment of the lacquer-containing residue is done in an essentially discontinuous way, i.e. in batches (batch method). With the help of a pump, the intermediate reservoir 20, the ultrafiltration unit 13 and the conduits 11 and 22 form a circuit in which the above increase in concentration of the lacquer content takes place. The residue that is enriched with lacquer up to sprayability will occasionally be held up in the intermediate reservoir 23 before it is reused. In the intermediate reservoir 23 the color of the lacquer may be adjusted at one's discretion.

In this context, the capacity of the ultrafiltration unit 13 can be dimensioned in a way that it removes water from the cubicle waste water at a speed lower than the speed at which permeate is fed to the paint spraying station. This embodiment of the method of the invention is typically suited for operating the paint spraying station during the normal day-time work hours, the capacity of the ultrafiltration unit 13 being dimensioned in a way that the residue of the ultra-filtration will be enriched with lacquer up to sprayability at times other than the work hours and especially during night-time.

For the execution of the method of the invention the lacquer used will preferably be an alkyd resin or a combination of alkyd or acrylic resin, because in combination with the other measures these substances are best suited for achieving the object of this invention mentioned hereinabove at an earlier instance.

It is another aim to further limit the burden to the environment by increasing the period of use of the cubicle waste water between water changes which might be compelling due to the multiplication of microorganisms. For this purpose, a biocidal constituent will preferably be admixed to the dispersion and/or the cubicle waste water. As examples for such substances triazine derivatives such as especially hexahydro-1,3,5,-triazine and benzyl alcohol as well as its derivatives in concentrations of 0.1–0.3% by volume (related to the volume of the cubicle waste water) may be quoted.

We claim:

1. A method for paint spraying with a dispersion of oven curable lacquer enamel in water in a paint spraying booth that is provided with a cubicle with a water-rinsed rear wall for collecting and washing out of overspray in sink water in the spraying booth, the entire sink water being separated by ultrafiltration into ultrafiltrate water and lacquer-containing residue, the ultrafiltrate water being returned to the paint spraying booth, the lacquer-containing residue being enriched with lacquer by removing water until its lacquer content is essentially equal to that of dispersion that is freshly fed to the spray painting booth, the residue that is enriched with lacquer in this way being admixed to the freshly fed dispersion for reuse in spray painting, a constituent for preventing coagulation of the lacquer being admixed to the dispersion fed to the paint spraying booth, a constituent for inhibition of curing is admixed to the dispersion that is fed to the paint spraying booth, a constituent is admixed to the sink water for adjusting the flow rate of the ultrafiltrate water through the ultrafilter, and the conductivity of the water returned to the paint spraying booth is monitored and kept below $10^{-4} \Omega^{-1} cm^{-1}$.

2. A method as claimed in claim 1, wherein the constituent for adjusting the flow rate of the ultrafiltrate water through the ultrafilter is a glycol derivative.

3. A method as claimed in claim 1, wherein the lacquer is one of an alkyd resin, and a combination of alkyd and acrylic resin.

4. A method as claimed in claim 1, wherein the constituent for preventing coagulation of the lacquer is selected from the group consisting of aliphatic amines having an average molecular weight of 75 to 133, mixtures thereof and derivatives thereof.

5. A method as claimed in claim 1, wherein at least one of the dispersion ad the sink water additionally contains a biocidal constituent.

6. A method as claimed in claim 1, wherein the enrichment of the lacquer-containing residue up to the lacquer content of the freshly fed dispersion is essentially continuous and the residue enriched with lacquer is reused for spray painting in an essentially continuous way.

7. A method as claimed in claim 1, wherein the water conductivity of less than $10^{-4} \Omega^{-1} cm^{-1}$ is achieved by reverse osmosis.

8. A method as claimed in claim 1, wherein the enrichment of the lacquer-containing residue up to the lacquer content of the freshly fed dispersion is essentially discontinuous, the residue enriched with lacquer being kept in an intermediate reservoir prior to is being reused for spray painting.

9. A method as claimed in claim 8, wherein the enrichment of the lacquer-containing residue takes place batch-wise.

* * * * *